United States Patent
Neubauer et al.

(10) Patent No.: US 6,611,985 B1
(45) Date of Patent: Sep. 2, 2003

(54) CLEANING CARD FOR MAGNETIC TRACK AND CHIP CARD READ/WRITE DEVICES AND METHOD FOR PRODUCING SAID CLEANING CARD

(75) Inventors: Lutz Neubauer, Wünnenberg-Leiberg (DE); Ernst Emil Ruch, Wollerau (CH)

(73) Assignees: ECS AG, Baar (CH); Wincor Nixdorf GmbH & Co. KG, Paderborn (DE)

( * ) Notice: Subject to any disclaimer, the term of this patent is extended or adjusted under 35 U.S.C. 154(b) by 0 days.

(21) Appl. No.: 09/806,138
(22) PCT Filed: Sep. 28, 1998
(86) PCT No.: PCT/EP98/06147
§ 371 (c)(1), (2), (4) Date: Jul. 20, 2001
(87) PCT Pub. No.: WO00/19418
PCT Pub. Date: Apr. 6, 2000

(51) Int. Cl.⁷ .............................. B41J 29/17; G11B 5/41
(52) U.S. Cl. ................................. 15/210.1; 156/244.11; 428/90
(58) Field of Search .......................... 15/104.93, 104.94, 15/210.1, 118; 428/90, 284, 286; 156/244.11

(56) References Cited

U.S. PATENT DOCUMENTS

| | | | | |
|---|---|---|---|---|
| 3,029,457 A | * | 4/1962 | Hunder et al. | |
| 4,390,387 A | * | 6/1983 | Mahn | |
| 4,734,145 A | * | 3/1988 | Monia | |
| 5,047,103 A | * | 9/1991 | Abram et al. | |
| 5,227,226 A | * | 7/1993 | Rzasa | |
| 5,525,417 A | * | 6/1996 | Eyler | |
| 5,536,328 A | * | 7/1996 | Morgavi | |
| 5,832,556 A | * | 11/1998 | Eyler | |
| 6,156,407 A | * | 12/2000 | Neubauer et al. | |

FOREIGN PATENT DOCUMENTS

| | | |
|---|---|---|
| DE | 35 38 223 C2 | 7/1994 |
| DE | G 94 14 719.1 | 12/1994 |
| DE | 196 22 287 C1 | 10/1997 |
| GB | 2225747 | * 6/1990 |
| GB | 2 225 747 A | 6/1990 |
| JP | 63-173216 | * 7/1988 |
| JP | 06176327 | 6/1994 |
| JP | 07249156 | 9/1995 |
| JP | 08287429 | 1/1996 |
| JP | 2000-173031 | * 6/2000 |
| WO | WO 94/09488 | * 4/1994 |
| WO | PCT/EP97/06409 | 8/1998 |
| WO | WO 98/44449 | 8/1998 |

* cited by examiner

Primary Examiner—Terrence R. Till
(74) Attorney, Agent, or Firm—McCormick, Paulding & Huber LLP

(57) ABSTRACT

The inventive cleaning card for magnetic track and chip card read/write devices has a card-shaped support (2) which consists of a nonwoven material and which is partially layered with a soft cleaning material (6). Said cleaning material (6) is located on several predetermined surface areas of the support (2) and consists of a fibrous flock with densely stuck-on individual fibres of predetermined length and with a predetermined diameter, which project essentially perperdincularly away from the support (2).

19 Claims, 3 Drawing Sheets

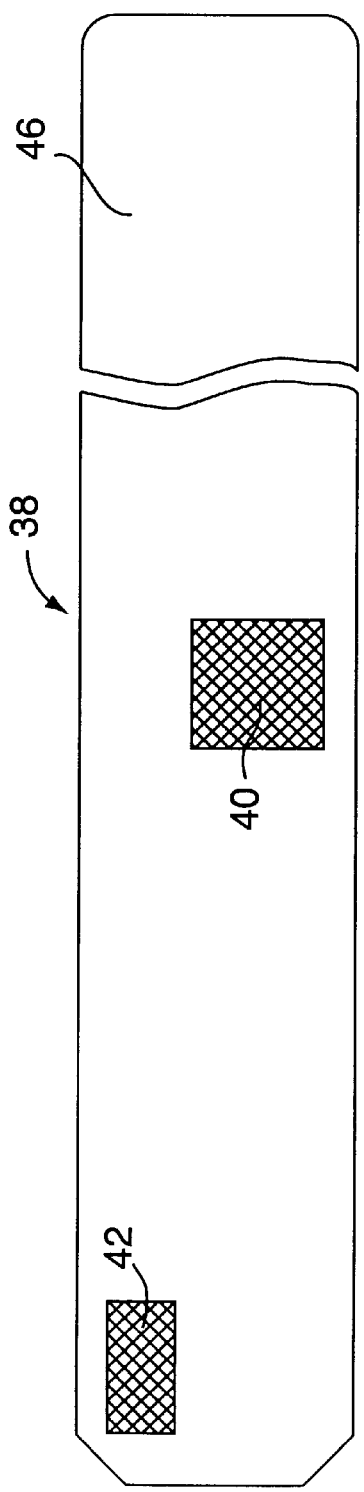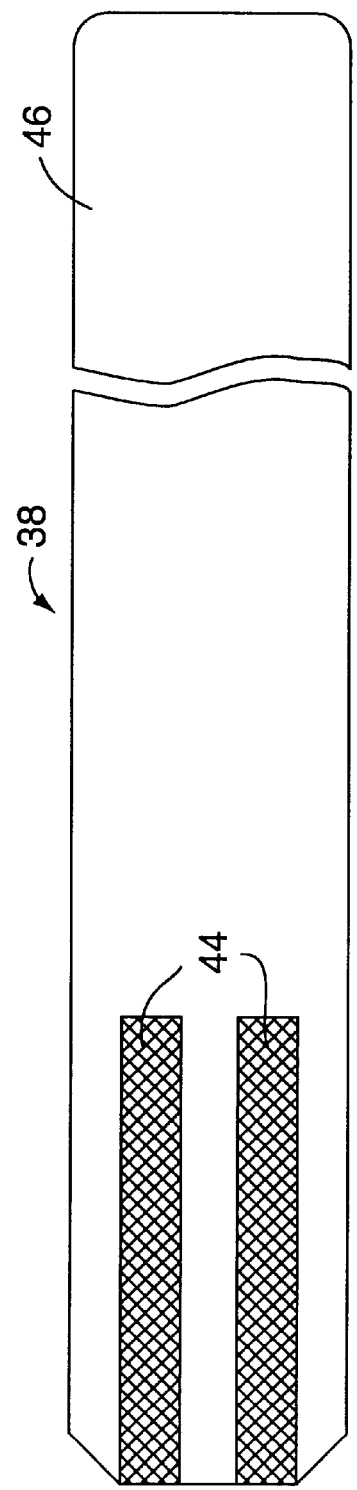

Figure 1:
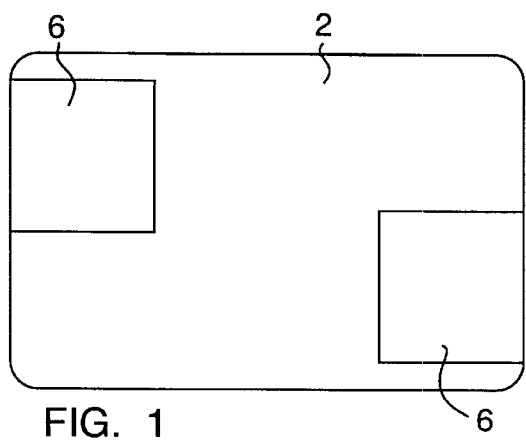

CLEANING CARD FOR MAGNETIC TRACK AND CHIP CARD READ/WRITE DEVICES AND METHOD FOR PRODUCING SAID CLEANING CARD

The present invention concerns a cleaning card for magnet track card and chip card writing/reading devices according to the preamble of claim 1.

Cleaning cards for magnet strip write/read units, such as for example in money dispensing automats of money institutions and the like, are known and are for example described in DE-PS 35 38 223. In the case of such cards, there is found on one hand on a card shaped PVC-carrier, between two codable magnetic strips near the edges of the card, a cleaning fleece which upon insertion of the cleaning card into the concerned device slides on the magnetic reading head of the device and cleans it. This cleaning effect can be improved by the pre-application of a cleaning fluid to the fleece. In all events, the cleaning effect achieved in this way hardly meets today's requirements. Moreover, such cleaning cards are practically not useful for chip card contact stations, since a fleece sliding along the contact springs which sense the upper surface of the chip is not suitable to effectively clean the contact spots.

In DE-C-1 96 22 287 a cleaning card is proposed in which a slide carrying the cleaning material is built into a carrier having measurements corresponding to the chip card, which slide after the insertion of the cleaning card into a writing/reading device can be moved back and forth to clean the contacts. This solution is expensive.

In the earlier non-prepublished International Application PCT/EP97/06409 a cleaning card of the previously mentioned kind is already shown which is suited by simple means to absolutely reliably and optimally clean both magnet track writing and reading heads as well as chip contact stations. In this case it is proposed that the length of the individual fibers of the fiber flock cleaning material on at least one of the pre-given surface areas on one or the other side of the card be different from the length of the individual fibers on the other surface areas, with the individual fibers on the different surface areas having the same or different diameters. Such fiber flock fields upon the insertion of the card into the involved device permit a quasi dipping of the magnetic track writing and reading head and of the chip contact stations to be cleaned into the thickly set individual fibers to achieve a corresponding deep cleaning by way of a brushing effect.

While these cleaning cards achieve a good cleaning of the reading head and of the chip contacts, in addition the transport rolls in the money dispensing automat or writing/reading device still have to be cleaned with separate cleaning means.

The invention has as its object, the provision of a cleaning card of the aforementioned kind which as well as making possible a cleaning of reading heads and/or contact elements at the chip writing/reading contact station, also makes possible a cleaning of the transport mechanism for the magnetic track cards and chip cards.

This object is solved in accordance with the invention by a cleaning card of the aforementioned kind having the features given in the characterizing portion of claim 1.

While the writing and reading head as well as the contact elements of the contact stations are cleaned by the fiber flock material the transport mechanism, that is the transport rolls or bands of the device, are automatically cleaned by the fleece material of the card carrier. Preferably, this fleece material consists of plastic fibers which are pressed dryly together without a binding material. This dry pressed fleece material has a high shape stability and does not change its mechanical properties if for example it is wetted with a cleaning fluid.

The length of the individual fibers of the fiber flock cleaning material can, as in the case of the above-described earlier embodiment, on at least one of the pre-given surface areas on one or the other sides of the card can be different from the length of the individual fiber of the other surface areas, with the individual fibers on the different surface areas having the same or different diameters.

For the cleaning of a hybrid writing/reading device which along with the magnet head for the reading of magnet strips and along with a chip station for the contacting of chip contacts on the chip card also has an optical sensor for capturing optical indications on the identity card, it is likewise practical if a first surface area is associated with the chip station, a second surface area is associated with the optical sensor and at least a third surface area is associated with the magnet head of the writing/reading device.

In a hybrid-writing/reading device of the previously mentioned kind, the optical sensor comprises a rigid block into which a sensing eye is set. This deeply applied sensing eye looks onto one side of the identity card and reads a security scrip not readable with the unaided eye. Because of the constructionwise deep setting of the sensor eye there collects in the region of the sensor eye heavy dirt in the form of dust flecks and dirt particles which originate partly from the cards and partly from the air stream coming from outside into the writing/reading device. The sensor eye can not be cleaned with a customary cleaning card which is only coated with a fleece since the fleece layer does not reach into the sensing eye. Contrary to this, with the cleaning card of the invention, which for the cleaning of the contacts and sensors has certain surface areas layered with a fiber flock, the sensor eye is reached and cleaned by the fibers. Advantageously in this case, the fiber length of the fiber flock material in the first and second surface area is about 6.5 to 10 mm, preferably 8 mm. The fiber strength in the first and second surface areas preferably is about 33 to 90 dtex, preferably 67 dtex. The fiber flock material in the first and the second surface areas works as a brush which not only cleans the contacts of the chip contact station but also reaches an cleans the sensor eye of the optical sensor.

For the cleaning of the magnetic head it is to the contrary advantageous to use a short fiber material. In this case, the fiber length in the third surface area is about 0.3 to 2 mm, preferably 0.5 to 1 mm. The fiber strength in this area is from 1.7 to 6.8 dtex, preferably 3.3 dtex.

The arrangement of the surface areas on the cleaning card depends on the construction of the writing/reading device, which on the other hand is directed to the reading of chip cards of a selected standard.

According to the construction of the writing/reading device it can be advantageous if the fleece carrier is connected with a grip section extending in its insertion direction. This simplifies the insertion of the cleaning card from the rear side of the device by service personnel or also by the user of the writing/reading device. The length of the grip section depends on the construction of the writing/reading device.

Optimally effective is a wet cleaning, for which the fiber flock cleaning material and also the fleece carrier itself is wetted with a cleaning fluid. This can immediately before use of the card be applied by spraying or the card can be dipped into a container of the cleaning fluid. Preferably, the cleaning card is enclosed in a tear open bag in the condition of having been moistened with a liquid cleaning material.

Further, the present invention concerns a method for the manufacture of a cleaning card for magnet strip card and chip card writing/reading devices in which a flat carrier having a fleece material and separable into several cards is partially layered with a soft cleaning material and as the case may be is also partially layered with a codable material.

This method is distinguished in accordance with the invention in that, as the case may be, the codable material is printed in the form of a screen printable pigmented color in several screen printing steps; then on at least one of the card sides pre-given surface areas for the cleaning material are layered in a screen printing step with a two component adhesive, for example a urethane glue; then, as the cleaning material, thickly standing individual fibers of pre-given length and pre-given diameter are inserted essentially vertically into the adhesive beds of the individual surface areas; then the flat fleece carrier with the layers is subjected to a drying process; and finally the non-attached remaining fibers are washed away.

Further, thereafter the flat fleece carrier can be cut to form several cleaning cards or cloths and the codable surface areas can be coded. Further the individual cleaning cards can then be moistened with a liquid cleaning material and each can be encased in a tear open bag.

Figure 2:
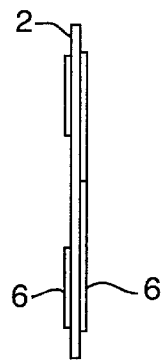
Figure 3:
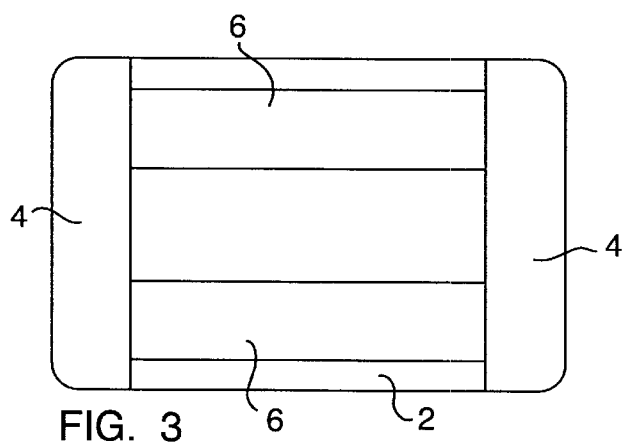
Figure 3A:
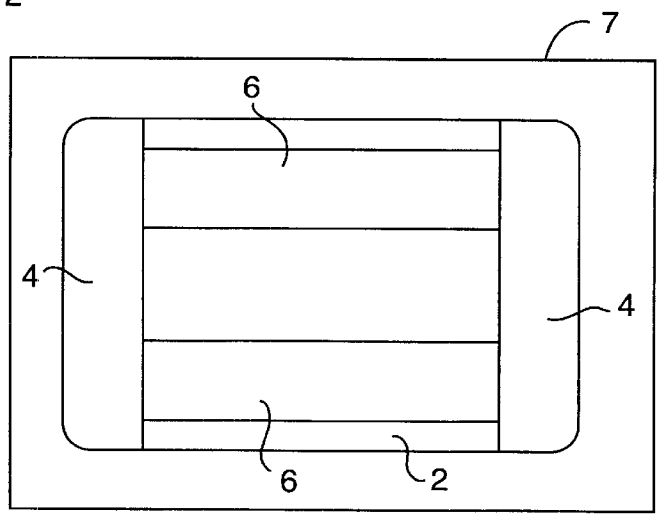

Embodiments of the invention are explained in more detail hereinafter by way of examples shown in the drawings. The drawings are:

FIGS. 1 and 2 a view (plan view) of the chip contact side and a side view of a cleaning card, in at least nearly natural size, FIG. 3 a plan view of the magnet head side of the cleaning card of FIG. 1, FIG. 3A a plan view of the cleaning card in a tear open bag.

Figure 4:
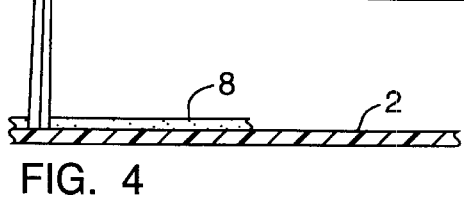
Figure 5:
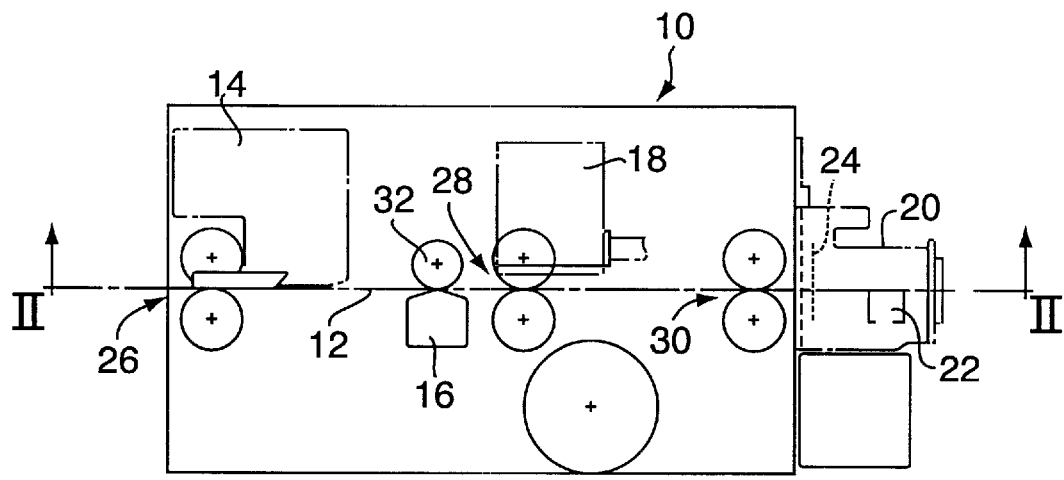
Figure 6:
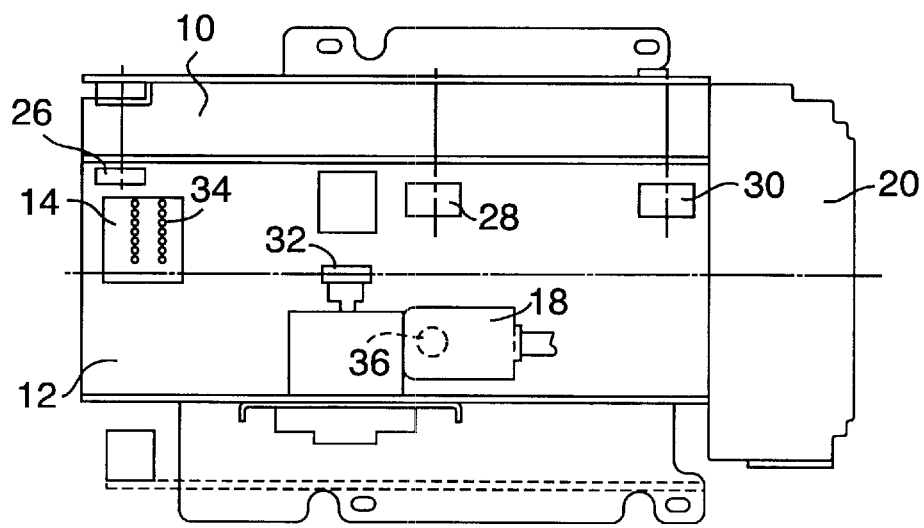

FIG. 4 a transverse section through the cleaning card of FIGS. 1 to 3 in the area of a flocked fiber field in enlarged size, FIG. 5 a schematic side view of a writing/reading device intended for use with a cleaning card according to a second embodiment of the invention, FIG. 6 a schematic section taken along the line VI—VI in FIG. 5 parallel to the card transport plane in the writing/reading device, FIG. 7 a plan view of one side of the cleaning card according to the second embodiment, and FIG. 8 a plan view of the opposite side of the cleaning card pictured in FIG. 7.

The card shaped carrier 2 of a cleaning card according to FIGS. 1 to 4 of the invention, for magnetic track card and chip card writing/reading devices, and which cleaning card has a partial layer 4 with a codable material as well as a partial layer 6 with a soft cleaning material, consists preferably of a fiber fleece made of plastic fibers which are dryly pressed together without a binding material. One such fleece material is for example, distributed by the Firm Carl Freudenberg, Weinheim under the designation DR 1441. It possesses a fine upper surface and with low thickness a high stiffness and shape stability.

The cleaning material 6 on the carrier 2 consists of a fiber flock with thickly standing individual fibers 6' (FIG. 4), extending generally vertically from the carrier, of predetermined length and predetermined diameter. For this on at least one side of the card predetermined surface areas for the cleaning material are layered by a screen printing process with a two component adhesive 8, for example a urethane glue, and then the thickly standing individual fibers 6' of predetermined length and predetermined diameter are inserted essentially vertically into the adhesive beds of the individual surface areas. Thereafter, the flat plastic carrier with the layers are subjected to a drying process, after which as a final step the non-attached remaining fibers are washed away.

The method for manufacturing a so-called fiber flock is known in itself, whereby the individual fibers are isolated by a screen and arranged parallel to one another, whereupon the ends of the fibers are electrostatically charged in order to be able to insert the fibers perpendicularly into the adhesive bed.

As shown in FIGS. 1 and 3, the cleaning card includes a chip contact side (FIG. 1) and a magnet head side (FIG. 3), where the flocked fiber cleaning material 6 is arranged at several pre-given surface areas. In this case, the individual fibers 6' of the flocked fiber cleaning material 6 can at the pre-given surface areas of one or the other sides of the card be of the same or different length, for example 0.5 to 1.5 mm, and can be of the same or different diameter, for example 3.3 to 6.7 mm.

The magnet head side (FIG. 3) additionally carries partial layers 4 of codable material, here in the form of a several layered colored application.

Unlayered surface sections of the cleaning card can be printed with information.

As already mentioned, such a cleaning card can be enclosed in a tear open bag (not shown) 7 shown in FIG. 3A in a condition of having been moistened with a liquid cleaning material, for example, Vertrel XF-P35.

For the manufacture of such cleaning card, preferably one flat fleece carrier separable into several cards is partially layered with a codable material as well as with a soft cleaning material. In this case, the codable material is printed several times in the form of a screen printable pigmented color by a screen printing process, then on at least one side of the card the predetermined areas for the cleaning materials are layered with a two component adhesive by a screen printing process; then for the cleaning material thickly standing individual fibers of predetermined length and predetermined diameter are inserted vertically into the adhesive beds of the individual surface areas; then the flat plastic carrier with the layers is subjected to a drying process; and finally the non-attached remaining fibers are washed away.

Thereafter, the flat fleece carrier is cut to form several cleaning cards and as the case may be the codable surface areas are coaded. The individual cleaning cards are then moistened with a cleaning fluid and each is encased in a tear-open bag.

FIGS. 5 and 6 show a writing/reading device known in itself, for identity cards, which is accordingly illustrated only in regard to its most important components. It includes a frame 10, inside of which along a transport path 12 are arranged a chip contact station 14, a magnet head 16 and an optical sensor 18, a so called MM-sensor. At the input end of the device is a closure unit 20 which includes a further magnet head 22 as well as a movable closure 24. Serving to pull in and push out an identity card along the transport path 12, arranged laterally along the transport path are transport roll pairs 26, 28, 30. A further roll 32 is arranged at the magnet head 16, which roll presses the identity card against the magnet head. The transport rolls can be cleaned by the fleece carrier of the cleaning card.

The cleaning cards of the invention illustrated in FIGS. 7 and 8 are for the purpose of making possible the cleaning of the contact elements 34 of the chip contact station, the magnet head 16, and the sensor eye 36 of the sensor 18 (FIG.

6) from the rear side of the device, that is from the left side as seen in FIGS. 5 and 6. The cleaning card includes an elongated rectangular fleece carrier 38 of the above described kind.

On its one side, the fleece carrier 38 has two surface areas 40 and 42 each of which is layered with a fiber flock serving as a cleaning material. The first surface area 40 is thereby associated with the chip contact station 14, while the second surface area 42 is associated with the sensor 18. The length of the fibers in these two areas 40 and 42 is between 6.5 and 10 mm, preferably 8 mm. The fiber strength is between 33 and 90 dtex, preferably 67 dtex. The arrangement of the surface areas 40 and 42 on the fleece carrier 38 is so chosen that the areas 40 and 42 upon insertion of the cleaning card from the rear side of the device into the writing/reading device simultaneously come to lie under the chip station 14 and the sensor 18. Since in this case the contact elements 34 of the chip contact station 14 are not depressed, the relatively long fibers of preferably 8 mm length are also needed in the surface area 40.

On the opposite side, the fleece carrier 38 has two strip shaped, and parallel to one another, third surface areas 44, which likewise are layered with flocked fiber and serve to clean the magnet head 16. The length of the fibers in these areas is between 0.3 and 2 mm, preferably 0.5 to 1 mm. Their strength is between 1.7 and 6.8 dtex, preferably 3.3 dtex.

The cleaning card illustrated in FIGS. 7 and 8 is elongated toward the right by a grip section 46 by means of which the card can easily be guided into the device.

Further, the cleaning card can be provided with still further non-illustrated surface areas of a codable material, especially magnet strips. The information applied to these code strips can serve for example to allow a movement of the cleaning card inside of the writing/reading device.

The invention claimed is:

1. A cleaning card for magnetic strip card and chip card writing/reading devices comprising:
   a card shaped carrier made at least in part from a fleece material:
   a soft cleaning material arranged on a plurality of predetermined surface areas of the carrier, wherein the soft cleaning material includes a fiber flock having a plurality of individual fibers attached to and extending generally vertically from the carrier.

2. A cleaning card according to claim 1, further characterized in that the fleece material is made of plastic fibers which are pressed together without a binding means.

3. A cleaning card according to claim 1, further characterized in that the individual fibers of the fiber flock in a first predetermined surface area have a length and the individual fibers of the fiber flock in a second predetermined surface area have a length that is different from the length of the individual fibers in the first predetermined surface area, with the individual fibers on the different surface areas having the same or different diameters.

4. A cleaning card according to claim 1, further characterized in that on at least one side of the card the soft cleaning material is arranged at several predetermined surface areas.

5. A cleaning card according to claim 1, further characterized in that the card is moistened with a liquid cleaning material and is enclosed in a tear open bag.

6. A cleaning card according to claim 1, further characterized in that a first predetermined surface area is positioned on the card to align with a chip contact station portion of the device, and a second predetermined surface area is positioned on the card to align with a magnet head portion of the device, and a third predetermined surface area is positioned on the card to align with an optical sensor portion of the device.

7. A cleaning card according to claim 6, further characterized in that the fibers in the soft cleaning material in the first and the second predetermined surface areas have a length of about 6.5 to 10 mm.

8. A cleaning card according to claim 7, further characterized in that fibers in the first and the second predetermined surface areas of the soft cleaning material have a strength of about 33 to 90 dtex.

9. A cleaning card according to claim 6, further characterized in that the fibers in the third predetermined surface area of the soft cleaning material have a length of about 0.3 to 2 mm.

10. A cleaning card according claim 9, further characterized in that the fibers in the third predetermined surface area have a strength of about 1.7 to 6.8 dtex.

11. A cleaning card according to claim 6, further characterized in that the first and second predetermined surface areas are arranged on a first side of the card shaped carrier and the third predetermined surface area is arranged on a second side of the carriers.

12. A cleaning card according to claim 6, further characterized in that the carrier is connected with a grip section extending in an insertion direction of the card.

13. A cleaning card according to claim 1, further characterized in that the card shaped carrier is partially layered with a codable material.

14. A cleaning card according to claim 1, further characterized in that the card shaped carrier is made in part of plastic.

15. A method for the manufacture of a cleaning card for magnet strip card writing/reading device, comprising the steps of:
   providing a flat carrier separable into several cards;
   forming an adhesive material bed on predetermined surface areas of the carrier by screen printing a two component adhesive onto the predetermined surface areas;
   inserting into the predetermined surface areas thickly standing individual fibers of predetermined length and predetermined diameter of a soft cleaning material essentially vertically into the adhesive material beds of the predetermined surface areas;
   drying the card; and
   washing the card to remove any unattached individual fibers.

16. The method according to claim 15, further characterized in that the adhesive includes a urethane glue.

17. The method according to claim 15, further including the step of screen printing a codable material onto the carrier.

18. The method according to claim 17, further including the step of providing a carrier being made at least in part from a fleece material, the carrier being suitable for division into more than one card shaped carrier.

19. The method according to claim 15, further characterized in that the cleaning card is moistened with a cleaning liquid and encased in a tear open bag.

* * * * *